United States Patent
Windmark et al.

(10) Patent No.: US 10,580,148 B2
(45) Date of Patent: Mar. 3, 2020

(54) GRAPHICAL COORDINATE SYSTEM TRANSFORM FOR VIDEO FRAMES

(71) Applicant: Microsoft Technology Licensing, LLC, Redmond, WA (US)

(72) Inventors: Mats Fredrik Johan Windmark, Lund (SE); Gustav Anders Traff, Sodra Sandby (SE); Gustaf Georg Pettersson, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 24 days.

(21) Appl. No.: 15/851,296

(22) Filed: Dec. 21, 2017

(65) Prior Publication Data
US 2019/0197709 A1  Jun. 27, 2019

(51) Int. Cl.
*G06T 7/33* (2017.01)
*G06T 7/246* (2017.01)
(Continued)

(52) U.S. Cl.
CPC ............. *G06T 7/33* (2017.01); *G06T 7/248* (2017.01); *G06T 7/73* (2017.01); *G06T 7/80* (2017.01);
(Continued)

(58) Field of Classification Search
CPC .... G06T 7/33; G06T 7/80; G06T 7/73; G06T 7/248; G06T 2207/10016; G06T 2210/12; G06T 2207/30244
See application file for complete search history.

(56) References Cited

U.S. PATENT DOCUMENTS

| | | | |
|---|---|---|---|
| 2012/0195466 A1* | 8/2012 | Teng | G06T 7/20 382/103 |
| 2016/0133022 A1* | 5/2016 | Sarkis | G06K 9/78 382/103 |
| 2017/0153787 A1 | 6/2017 | Chowdhary et al. | |

OTHER PUBLICATIONS

Adams, et al., "An empirical comparison of methods for image-based motion estimation", In Proceedings of the IEEE/RSJ International Conference on Intelligent Robots and Systems, vol. 1, Jan. 1, 2002, 6 Pages.
(Continued)

*Primary Examiner* — Qian Yang
(74) *Attorney, Agent, or Firm* — Alleman Hall Creasman & Tuttle LLP

(57) ABSTRACT

A computing device is provided, which is configured with a processor configured to compute feature points in a new frame and a prior frame of a series of successive video frames, compute optical flow vectors between these frames, and determine a homography transform between these frames based upon the feature points and optical flow vectors. The processor is further configured to apply the homography transform to the graphical element coordinate system in the prior frame to generate an updated graphical element coordinate system in the new frame, and generate a six degree of freedom camera pose transform therebetween based on the homography transform and a camera pose of the graphical element coordinate system in the prior frame. The processor is further configured to render an updated graphical element in the new frame relative to the updated graphical element coordinate system using the six degree of freedom camera pose transform.

20 Claims, 12 Drawing Sheets

(51) Int. Cl.
 *G06T 7/73* (2017.01)
 *G06T 7/80* (2017.01)
 *G06T 19/00* (2011.01)

(52) U.S. Cl.
 CPC .. *G06T 19/006* (2013.01); *G06T 2207/10016* (2013.01); *G06T 2207/30244* (2013.01); *G06T 2210/12* (2013.01)

(56) References Cited

OTHER PUBLICATIONS

Frikha, et al., "Camera pose estimation for augmented reality in a small indoor dynamic scene", In Journal of Electronic Imaging, vol. 26, Issue 5, Sep. 1, 2017, 12 Pages.

Marchand, et al., "Pose Estimation for Augmented Reality: A Hands-On Survey", In Proceedings of the IEEE transactions on visualization and computer graphics, vol. 22, Issue 12, Dec. 12, 2016, 19 Pages.

"International Search Report & Written Opinion Issued in PCT Application No. PCT/US2018/063532", dated Mar. 7, 2019, 13 Pages.

Pirchheim, et al., "Homography-based planar mapping and tracking for mobile phones", In Proceedings of the 10th IEEE International Symposium on Mixed and Augmented Reality, Oct. 26, 2011, 10 Pages.

\* cited by examiner

GRAPHICAL COORDINATE SYSTEM TRANSFORM FOR VIDEO FRAMES

BACKGROUND

With the proliferation of digital video cameras and camera-enabled computing devices, digital video has experienced explosive growth in recent years. Graphics authoring tools have been developed that enable users to annotate video with graphical content. One challenge faced by software developers who develop such tools is the placement of the graphical content over video. While it may be relatively straightforward to display graphical content in a screen-locked orientation over video, challenges exist to displaying graphical content in a placement that adapts to the content of the video.

SUMMARY

To address the above issues, a computing device is provided, which is configured with a processor configured to compute feature points in a new frame and a prior frame of a series of successive video frames, compute optical flow vectors between the prior frame and new frame, and determine a homography transform between the new frame and prior frame based upon the computed feature points and the computed optical flow vectors for each frame. The processor is further configured to apply the homography transform to the graphical element coordinate system in the prior frame to thereby generate an updated graphical element coordinate system in the new frame, and generate a six degree of freedom camera pose transform between the graphical element coordinate system in the prior frame and the updated graphical element coordinate system in the new frame based on the homography transform and a camera pose of the graphical element coordinate system in the prior frame. The processor is further configured to render an updated graphical element in the new frame relative to the updated graphical element coordinate system using the six degree of freedom camera pose transform.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

The inventors of the subject application have recognized some drawbacks to prior technical approaches in augmented reality systems to the challenge of displaying graphical content in a placement that adapts to the contents of a video feed. One prior approach uses depth cameras to reconstruct a three-dimensional map of an environment while moving through the environment, in a process referred to as simultaneous localization and mapping. Once mapped, graphical elements may be displayed in a world-locked orientation relative to the three-dimensional map. This approach also consumes significant processing power, which can be a particular drawback in a portable battery powered device. Another prior approach uses optical tags positioned in the environment to define surfaces on which a graphical element may be virtually positioned. Such an approach has the drawback that prior setup of the real-world environment is necessitated. Unknown camera parameters and camera distortion, effects of a rolling shutter, and unknown effects of camera stabilization systems all complicate the problem of positioning a graphical element in a world-locked orientation relative to an underlying video frame without using depth cameras, IMUs, or optical tags in the real environment.

To address these issues, the inventors have conceived of a visual approach to this challenge, which offers the potential benefits of precise positioning without undesirable drifting effects, and which does not require specialized hardware such as depth cameras or high precision IMUs, and does not consume excessive processer power. Advantageously, the approaches described herein may be implemented entirely on a portable device such as a handheld camera, smartphone or tablet, if desired. As well, the approaches described herein may be implemented on a personal computer, such as a desktop or laptop, or on a server.

Figure 1:
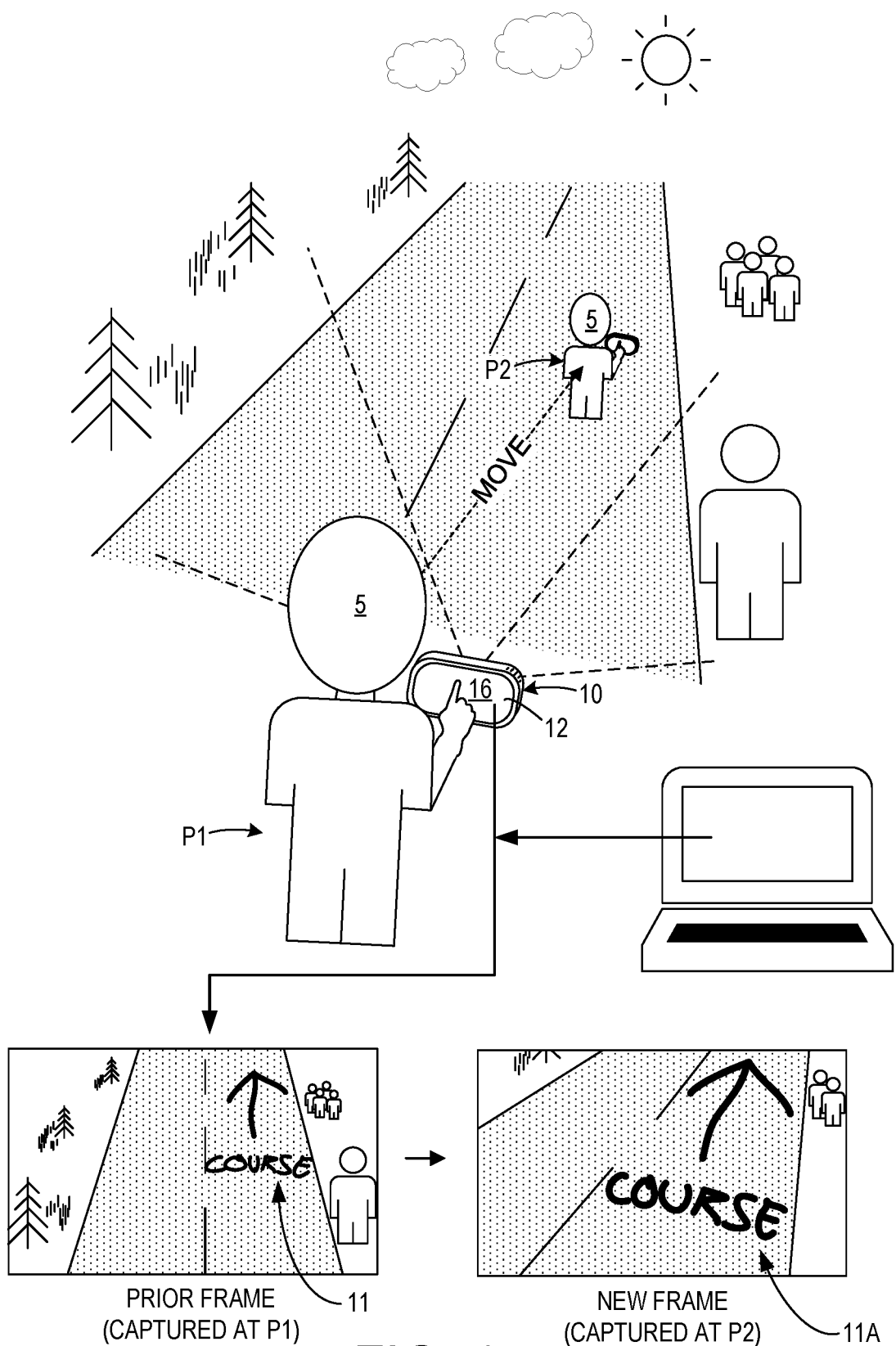
FIG. 1 is a view of a computing device that captures video frames and overlies graphical elements thereon, used in an example real-world environment, according to one implementation of the present disclosure.

Turning now to FIG. 1, a computing device 10 is illustrated according to one implementation of the present disclosure. Computing device 10 is configured as an augmented reality device and includes an on-board camera (see camera 12 in FIG. 6) configured to capture video frames of a real-word environment, and display those video frames in real time on a display 14 of the computing device 10, for example as a user 5 holding the computing device 10 walks through the environment. An input device 16 such as a touch sensor in display 14 is provided to enable the user 5 to input graphical elements 11 that the user would like to display on the real-world scene displayed on display 14. In the depicted example, computing device 10 is shown as a portable device, and may be configured as a handheld camera, smartphone or tablet, for example. It will be appreciated that the computing device 10 need not be portable in all use cases, and thus a laptop device is depicted in FIG. 1 as an example of a personal computer that may function as computing device 10. Other potential configurations of computing device 10 are further described below.

In the example of FIG. 1, the user 5 is depicted traveling down a path. At a first position P1, a video frame is captured and displayed by the computing device 10, and the user augments the captured video by inputting course annotations, depicted as the word "COURSE" and an arrow, via the input device 16 of the display 14. These graphical elements 11 are displayed at the screen location at which they were inputted in the video frame, and that screen location is associated with a real-world location underlying the screen location. The user then moves while capturing video to a new position P2. A new frame is captured at P2, which shows the real-world location at which the graphical elements 11 were input in the prior frame. Through processing of the optical data associated with the prior frame using the techniques described below, the position, orientation, and perspective of the inputted graphical element 11 are transformed from the prior frame to an updated graphical element 11A in the new frame having an updated position, perspective, and orientation. In this way, the previously inputted arrow and COURSE annotation appear as if they are affixed to the real-world surface over which they were originally inputted, even as the perspective of the real-world surface changes in the captured video frames as the camera on computing device 10 moves through the environment, since the graphical element 11 appears to move with the surface in the real world to which it is affixed.

Although the example shown in FIG. 1 depicts a user entering the graphical element 11 augmenting the video frames, it will be appreciated that in other use case scenarios the graphical element 11 can be generated programmatically by an application program, or can be read from stored data previously input by a developer or previously or contemporaneously input by another user. In this way, the user of FIG. 1 could be walking down the depicted path, and another remote user or an intelligent navigation program could be providing the graphical elements that annotate the path in the video frames.

Figure 6:
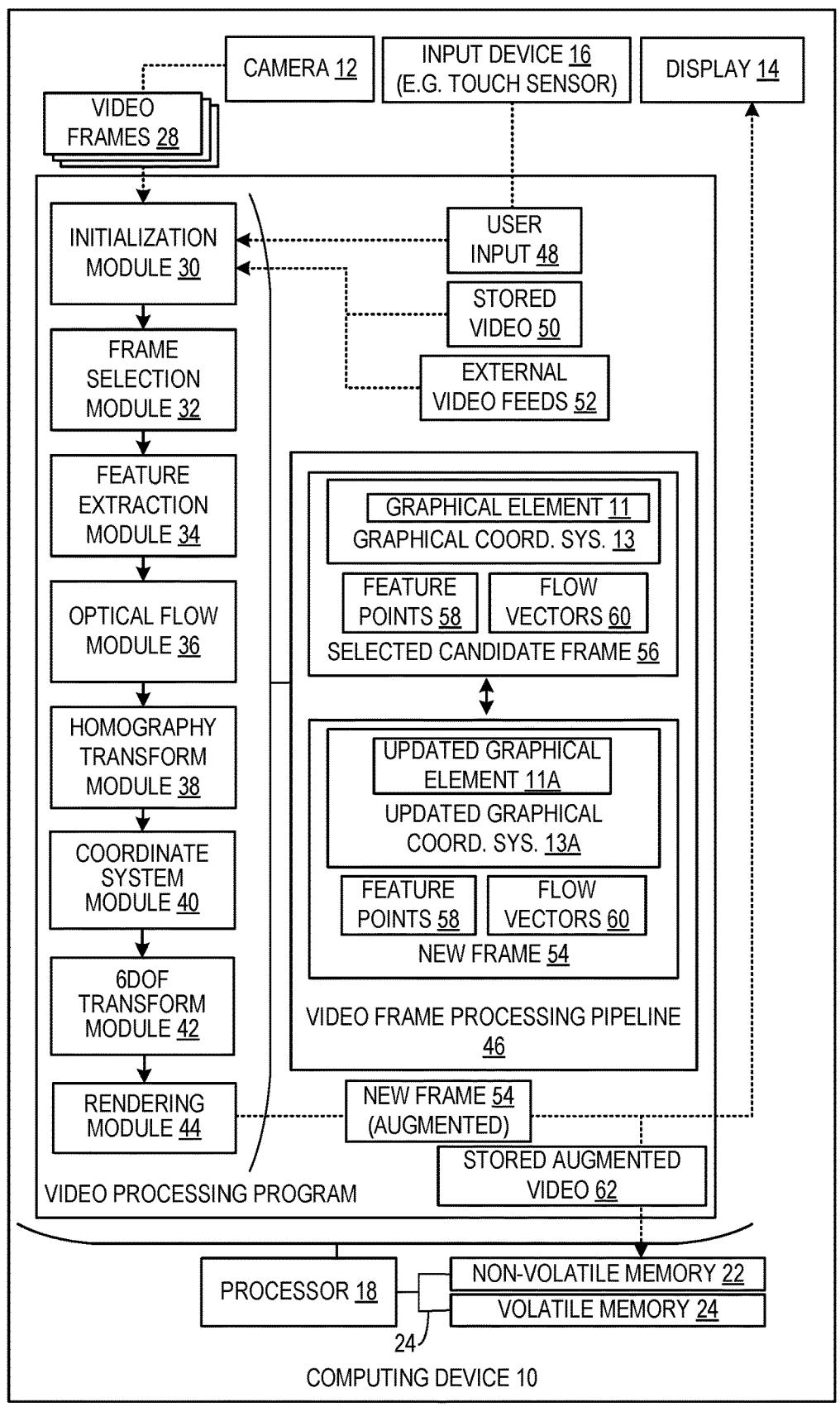
FIG. 6 is a schematic view of the computing device of FIG. 1, showing a simplified software and hardware architecture of the computing device.

Further, although the techniques described herein are largely described in the context of augmented reality, it will be appreciated that these techniques apply more generally to the application of graphical elements to video frames and should not be limited to augmented reality devices. Thus, the video frames that are annotated by the techniques disclosed herein are not limited to those captured by on-board cameras, but alternatively may be stored video frames 50, or video frames captured from an external camera or feed 52, as shown in FIG. 6. Thus, the annotations entered in FIG. 1 by the portable computing device, may alternatively be entered on stored video data using a personal computer such as the laptop depicted in FIG. 1.

Figure 2:
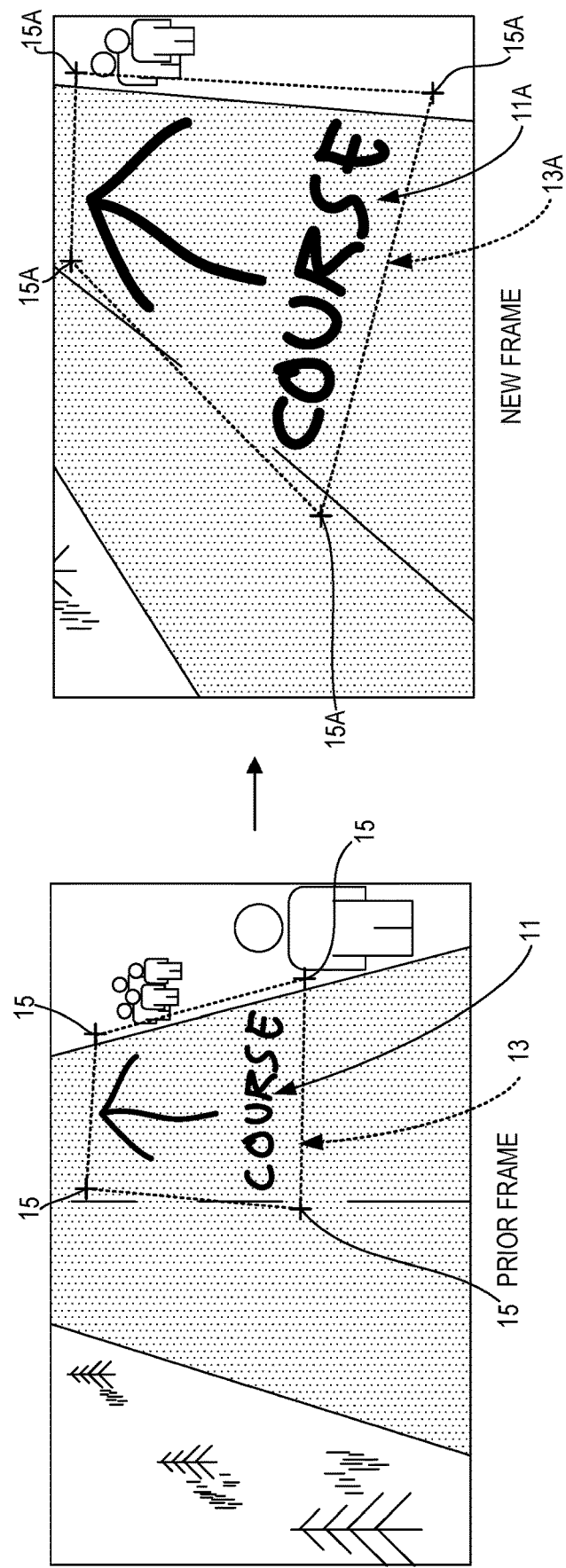
FIG. 2 is a close-up view of a prior frame and a new frame of FIG. 1, showing a change in perspective between the prior frame and new frame, and a corresponding change in position and orientation of a graphical element coordinate system and displayed graphical element in each frame.

Turning now to FIG. 2, in order to properly transform the graphical element 11 between the prior frame and the new frame, a graphical element coordinate system 13 is defined. The location of the graphical element coordinate system 13 may be defined by a bounding rectangle defined by a set of four points 15 in screen space, hereinafter simply referred to as a quad 15, which includes the inputted graphical element 11, in one example. The location of the quad 15 in screen space may be computed programmatically to bound the entered graphical element 11, for example. To enable perspective transformation between frames, the graphical element coordinate system 13 defined by the quad 15 may be converted from screen space in the prior frame to a virtual surface (typically a plane) in world space for the prior frame that approximates a surface in the real world that underlies the quad, using the image processing techniques described below. The position and orientation of the quad in world space may be explicitly inputted by the user, or may be determined using image processing techniques based on the inputted screen coordinates for the quad. The position of the quad 15 in screen space is transformed to an updated quad 15A position based on relative movement in the area of interest (the area underlying the quad 15 in screen space) between the frames that is detected using the image processing techniques described below, from screen space coordinates for the prior frame to screen space coordinates for the new frame. This enables the graphical element 11 to be rendered in the updated graphical element coordinate system 13A, as shown. To the user, the graphical element 11 appears fixed to the surface in the real world that is under the graphical element 11. Alternatively, for example, in the case of a developer or user entering curated content a priori, a tool may be provided that enables the developer to first select the quad 15 that defines the graphical element coordinate system 13, and then enter graphical element 11.

Figure 3:
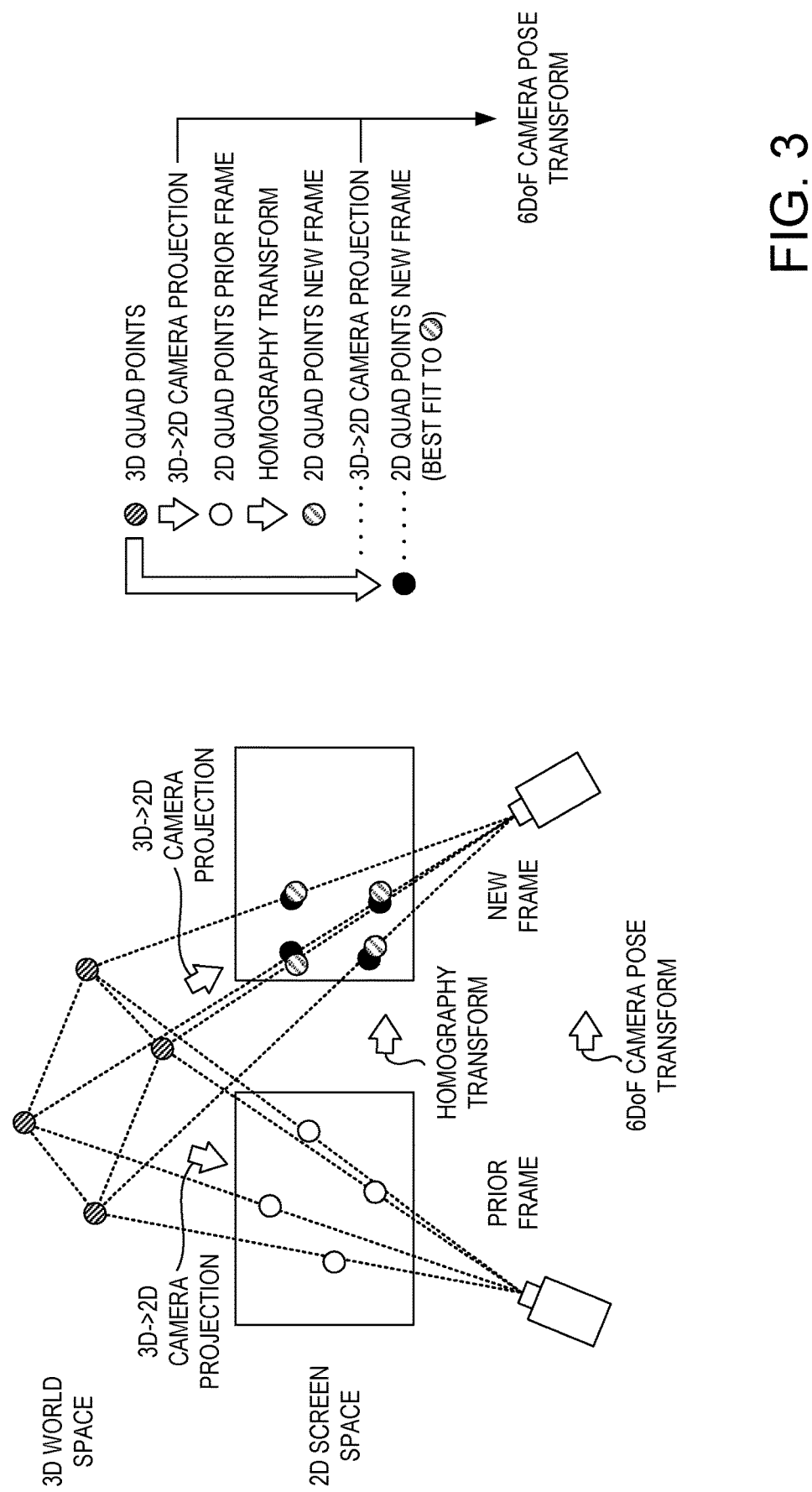
FIG. 3 illustrates camera projections and a homography transform utilized by the computing device of FIG. 1 to compute a six degree of freedom camera pose transform between the prior frame and new frame.

Turning now to FIG. 3, a process for converting the graphical element coordinate system from a prior frame to a new frame will be described. As discussed above, the graphical element coordinate system may be defined by a quad having three-dimensional coordinates in world space, which may be mapped to two-dimensional coordinates in screen sp ace.

Initially, the quad is identified in the prior frame. In the case of the prior frame being an initial frame in a series, the identification may be accomplished by receiving user input of the three-dimensional coordinates of the quad in world space. This may be accomplished by receiving user input of a translation (X, Y, Z) (relative to the camera origin) and rotation (pitch, roll, and yaw) of the three-dimensional plane on which the quad is to be positioned. Next, user input may be received which defines three dimensional coordinates of the quad on the three-dimensional plane in world space. The user may also input camera data such as the focal length. Alternatively, the quad may be defined in screen space by the user and the three-dimensional coordinates of the quad in the initial frame may be identified by other image processing techniques, perhaps over a series of frames.

With this information, a camera projection is computed to transform the three-dimensional coordinates of the quad to two-dimensional coordinates in screen space for the prior frame. From there, a homography transform is used to transform the quad from the prior frame to an updated quad in the new frame having two-dimensional coordinates in the screen space of the new frame. Next, a six degree of freedom camera pose is generated. The six degree of freedom camera pose transform is computed based on an estimated camera projection between the two-dimensional screen space position of the updated quad in the new frame and the three-dimensional position of the quad in the prior frame. It will be appreciated that this is appropriate because the approach herein is attempting to world lock a graphical element to a detected plane in world space, so the three-dimensional coordinates of the quad will be the same for the prior frame, the new frame, and all subsequent frames. The estimated camera projection produces projected screen space coordinates in the new frame that differ from the two-dimensional coordinates of the quad in the new frame by an error value. The estimated camera projection is typically iteratively solved to minimize the error value, using a solver such as the Levenberg Marquardt algorithm. This six degree of freedom camera pose transform is in turn used to render the graphical element 11 relative to the updated quad in the new frame.

Figure 4:
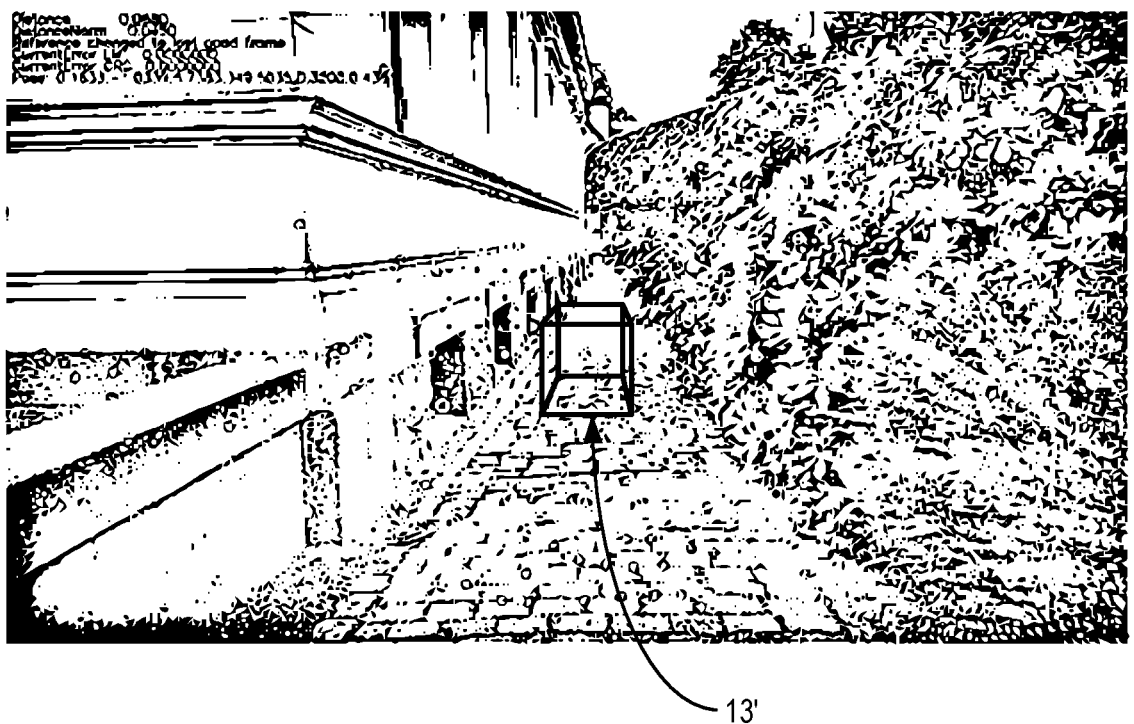
FIGS. 4 and 5 are views of a prior frame and a new frame computed by the computing device of FIG. 1, showing feature points, optical flow vectors, and a three-dimensional graphical element coordinate system in the form of a bounding box in each view.
Figure 5:
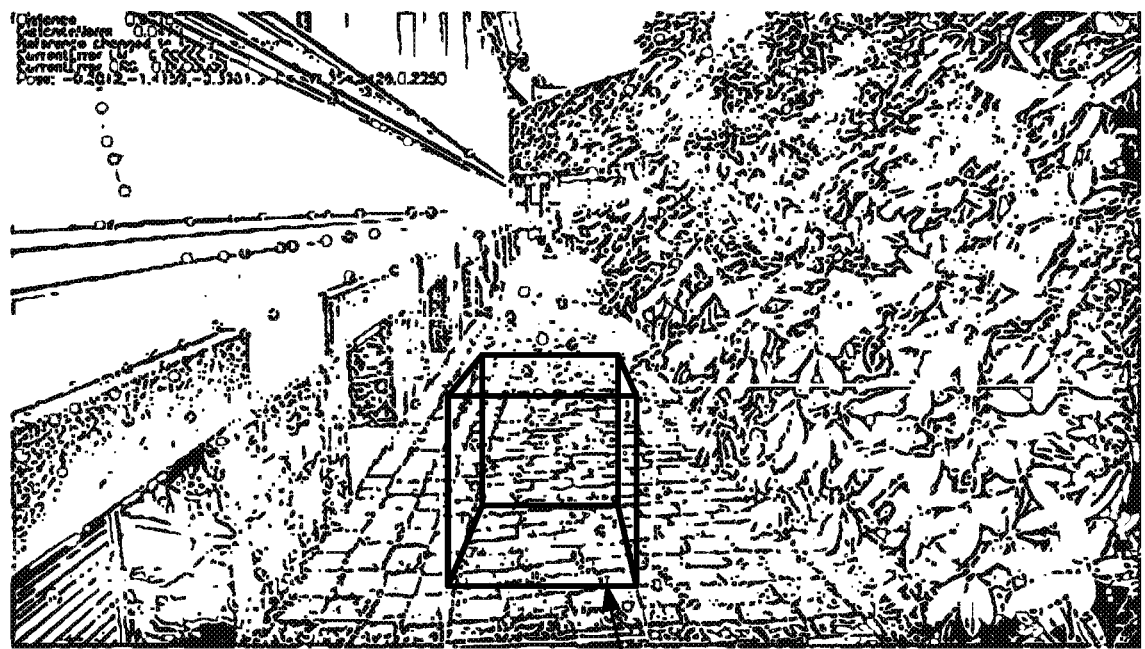

Turning now to FIGS. 4 and 5, an alternative form of graphical element coordinate system 13' is illustrated. Above, the graphical element coordinate system has been shown and described to be a quad 15 of points that define, exactly or within a predetermined fitting threshold, a plane. In FIGS. 4 and 5, the graphical element coordinate system 13' is shown to be a virtual three-dimensional box. This box may be defined on one surface by the quad 15 discussed above, and then projected for a length in a direction normal to the plane defined by the quad. Thus, the bounding box for the graphical element 11 may be constructed normal to the plane, with one set of vertices of the box at the quad 15, and the graphical element (not shown in FIGS. 4 and 5) may be rendered in or relative to the bounding box. In the example scene in FIGS. 4 and 5, the graphical element 13' is positioned along a cobblestone path between a building on the left and bushes on the right. The location of the graphical element 13' relative to the cobblestone path in world space is the same in each of FIGS. 4 and 5, but as the camera approaches the location, the size and shape of the box changes in screen space from a first position at 13' to an updated position at 13A', to make the box appear world locked. Various small circles are visible in FIGS. 4 and 5. These circles are a computer-generated output of actual feature points and flow vectors used in the image processing techniques described in detail below, which enables the transformation of the position and orientation of the graphical element coordinate system 13' solely based on visual data contained in the video frames, and not based on depth information from depth sensors, or optical tags placed in the environment. Numerous such feature points and flow points were identified on the cobblestone path, and the plane defining the bottom of the box was fit to those points using the techniques described herein. It will be appreciated that the box depicted in FIGS. 4 and 5 may be used to display three dimensional graphical elements in positions and orientations computed relative to the box, which may be within the box or outside of the box, or both.

Turning now to FIG. 6, an example software and hardware architecture of the computing device 10 of FIG. 1 is shown. In addition to the camera 12, display 14 and input device 16 previously described, computing device 10 includes a processor 18 coupled to non-volatile memory 20 and volatile memory 22 via a bus 24. Examples of processor 18 include a CPU, GPU or system on chip installed in a camera, smartphone or tablet, for example. In such examples, processing by the processor 18 may be accomplished entirely on the camera, smartphone or tablet without the use of an external processing device.

The processor is configured to execute a video processing program 26 to receive a series of successive video frames 28, perform the video processing functions described herein, and output a series of video frames that are augmented with graphical elements in world-locked orientations. The video processing program includes an initialization module 30, frame selection module 32, feature extraction module 34, sparse optical flow module 36, homography transform module 38, coordinate system module 40, 6DOF camera pose transform module 42, and rendering module 44. These modules implement a video frame processing pipeline 46. The function of each of these modules will be described in detail below with reference to the flowcharts of FIGS. 8-11. As an overview, initialization module 30 receives user input 48, such as the touch input shown in FIG. 1, from the input device 16, and video frames 28 from camera 12, and from these defines the initial coordinates of the graphical element coordinate system 13 for an initial frame in the pipeline. Alternatively, the initialization module 30 may receive stored video 50 or an external video feed 52 instead of the video frames from camera 12, as briefly described above. The functions of the initialization module 30 are described in further detail in FIG. 9.

For subsequent frames, the frame selection module 32 selects a candidate frame 56 to be compared to each new frame 54 received in the series of video frames 28. This selection process is described in detail in relation to FIGS. 7 and 10.

The feature extraction module 34 extracts optical feature points 58 from the bitmap data for each video frame. These feature points 58 may not be human recognizable, and typically include optical features defined by scale-invariant feature transform (SIFT) descriptors, speeded up robust features (SURF), both of which are scale-invariant so that do not vary with the scale of the image. An Oriented Fast and rotated Brief (ORB) feature detector may also be used to detect feature points 58.

The optical flow module 36 computes flow vectors 60 of a sparse optical flow between the selected candidate frame 56 and the new frame 54. This may include computing a sparse optical flow between an area of interest including the projected quad in the selected candidate frame 56 and a corresponding area of interest in the new frame 54. To avoid computational errors that may arise from computing the optical flow over frames that are separated by too great a distance in the video frame pipeline, the sparse optical flow may be computed by first transforming the prior frame using the transform previously found for the last matched frame. In this way, computing the optical flow between the new frame and the prior frame becomes a much easier problem, since the movement between the last matched frame and the new frame typically is much smaller than the movement between the prior frame and the new frame. Various techniques may be used that estimate the motion at various points in the area of interest, for example a sparse optical flow calculated for points on a fixed grid. One suitable approach that may be adopted for optical flow calculation is the pyramid Lukas Kanade algorithm, which is an iterative algorithm that first calculates optical flow in lower resolution downscaled images, and then successively refines optical flow to an increasingly finer scale. Additional details regarding detection of feature points and flow vectors are provided in relation to FIG. 8 below.

The homography transform module 38 determines a homography transform between the prior frame and new frame based upon the computed feature points and the computed optical flow vectors in an area of interest around the graphical element coordinate system in each of the prior frame and new frame. This process is described in detail in FIG. 11. The coordinate system module 40 applies the homography transform to the graphical element coordinate system 13 in the selected candidate frame 56, to thereby generate an updated graphical element coordinate system 13A (e.g., updated quad) in the new frame 54. An example of this is shown in FIG. 2 where the updated graphical element coordinate system 13A in the new frame has new coordinates in screen space as compared to graphical element coordinate system 13 in the prior frame.

The six degree of freedom (6DOF) transform module 42 generate a six degree of freedom camera pose transform between the graphical element coordinate system 13 in the prior frame, i.e., candidate frame 56, and the updated graphical element coordinate system 13A in the new frame 54 based on the homography transform determined by the homography transform module 38 and a camera pose of the graphical element coordinate system in the prior frame.

The rendering module 44 render an updated graphical element 11A in the new frame 54 relative to the updated graphical element coordinate system 13A using the six degree of freedom camera pose transform output by the 6DOF camera pose transform module 42. An example of this is shown in FIG. 2, where the updated graphical element 11A is shown in an updated graphical element coordinate system 13A that is positioned in an updated position in screen space in the new frame as compared to the prior frame. The augmented video frames output by the rendering module 44 may be stored as stored augmented video 62 in non-volatile memory, for later playback.

Figure 7:
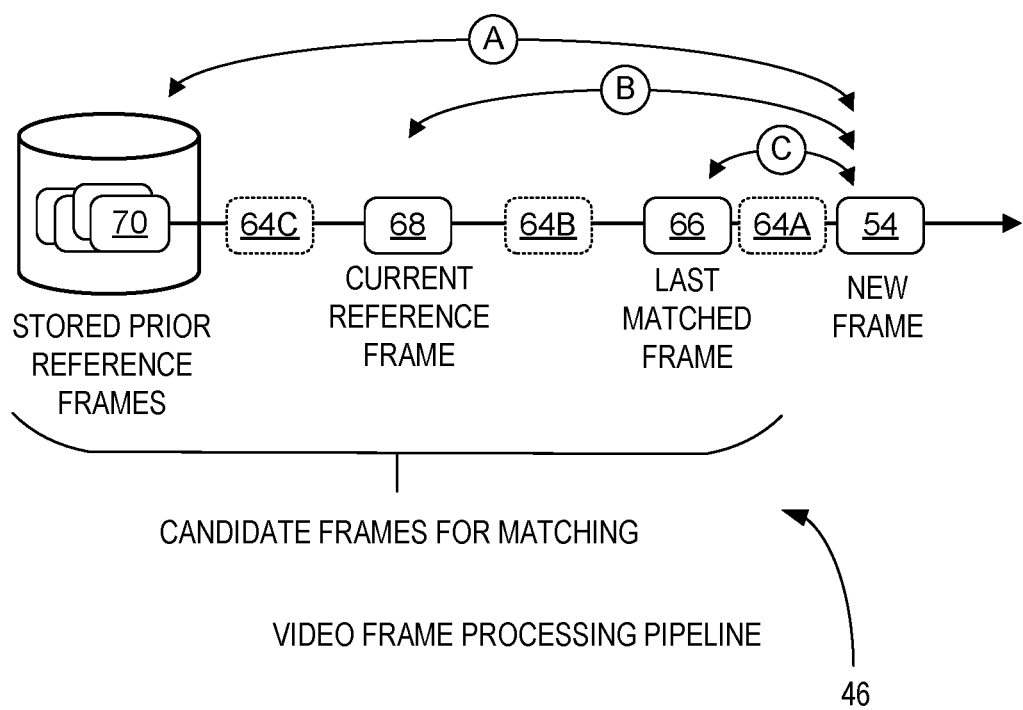
FIG. 7 is a schematic view of the video frame processing pipeline of FIG. 6, illustrating various frame types and their order, and also illustrating the functions of the frame selection module of FIG. 6 to select candidate frames for matching.

FIG. 7 illustrates a conceptual view of the video frame processing pipeline 46. On the right end is a new frame 54 in the series of video frames 28. The next oldest frame in the timeline is an unmatched frame 64A. Unmatched frames are those for which a suitable homography transform could not be computed. Following unmatched frame 64A is last matched frame 66, unmatched frame 64B, current reference frame 68, unmatched frame 64C and stored prior reference frames 70. The last matched frame 66 is the most recent frame for which a suitable homography transform could be calculated according to the methods described herein, i.e., within a suitable threshold. Unmatched frames 64A-64C may result due to camera shake or blur in the received images, for example, and the ability of the pipeline to skip over such frames during analysis provides for robust performance even in the presence of such camera shake. Reference frames are akin to keyframes and contain an increased amount of metadata relative to other matched frames. As described in detail in reference to FIG. 10 below, depending on the situation, the frame selection module 32 may choose to match the new frame 54 against either the stored prior reference frames 70 as shown at A, the current reference frame 68 as shown at B, or the last matched frame 66 as shown at C. The circumstances under which each type of frame is chosen for matching will be described in detail below.

Figure 8:
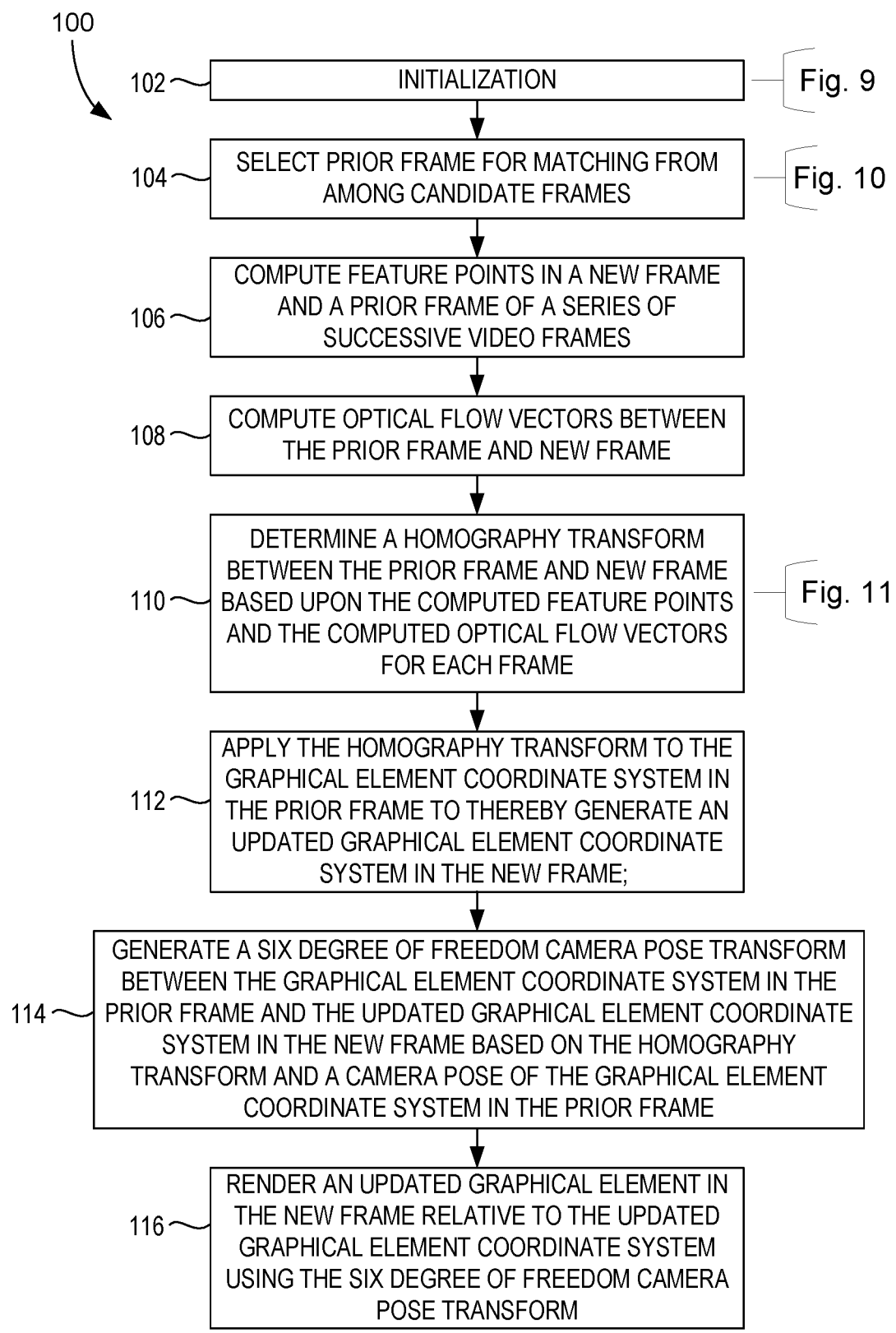
FIG. 8 is a flowchart of a method for implementing a graphical element coordinate system transform for video frames, according to one aspect of the present disclosure.

Turning now to FIG. 8, a method is shown generally at 100 for processing video frames and transforming the location of a graphical element coordinate system for graphical elements superimposed over the video frames based on the optical data in the video frames. Processor 18 of computing device 10 above is typically configured to execute the steps of method 100. Thus, method 100 may be implemented on the hardware described above, or by the processors of the devices described below in relation to FIGS. 12 and 13, or by other suitable hardware devices programmed to implement the steps of method 100.

Method 100 includes, at 102, implementing an initialization phase of analysis of a series of successive video frames. In the initialization phase, which is described in detail in relation to FIG. 9 below, the method defines various frame types in the video frame pipeline, and receives input that is used to define the initial location of the graphical element coordinate system in both three-dimensional world space and two-dimensional screen space in an initial frame, as well as to define a camera pose for the initial frame.

Figure 10:
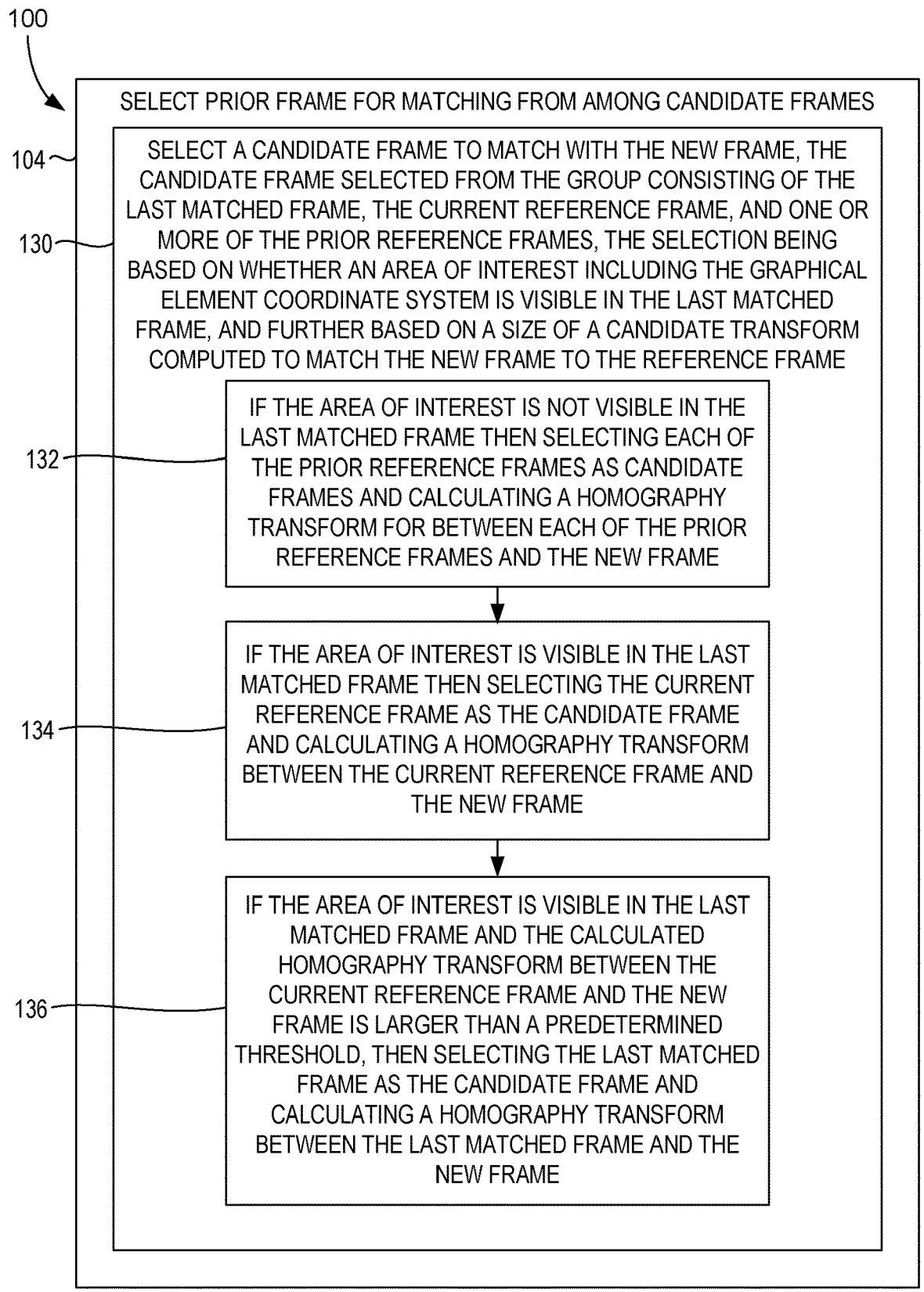
FIG. 10 is a continuation of the flowchart of FIG. 8, showing additional details of the selection step of the method.

Following initialization, at 104 the method includes selecting a prior frame for matching from among candidate frames. FIG. 10 shows details of the selection of the prior frame based on various conditions, as will be described below. At 106, the method includes computing feature points in a new frame and a prior frame of the series of successive video frames received. At 108, the method further includes computing optical flow vectors between the prior frame and new frame. As discussed above, various techniques for computing the optical flow may be used, which estimate the instantaneous image velocities or discrete image displacements at a variety of points in the area of interest in each of the prior frame and new frame. At 110, the method further includes determining a homography transform between the new frame and prior frame based upon the computed feature points and the computed optical flow vectors for each frame. Details regarding the determination of the homography transform, including the ranking and selection of a top ranked homography transform from among candidates, are described below in relation to FIG. 11.

At 112, the method includes applying the homography transform determined in at step 110 to the graphical element coordinate system in the prior frame to thereby generate an updated graphical element coordinate system in the new frame. Application of the homography transform may be accomplished by using a selected top ranked homography transform (see FIG. 11) to move the projection of the quad in the candidate frame to the new frame according to an estimated camera motion, an example of which is illustrated in FIG. 2. At 114, the method includes generating a six degree of freedom camera pose transform between the graphical element coordinate system in the prior frame and the updated graphical element coordinate system in the new frame based on the homography transform and a camera pose of the graphical element coordinate system in the prior frame. The application of the six degree of freedom camera pose transform may include minimizing the screen coordinate distances between the projected three-dimensional quad from the prior frame (i.e., candidate frame) projected into screen space for the new frame and the two-dimensional quad from the prior frame (i.e., candidate frame) transformed by the homography transform into two-dimensional coordinates in the new frame, using for example, a Levenberg Marquardt algorithm.

At 116, the method includes rendering a graphical element in the updated graphical element coordinate system. As discussed above, the graphical element coordinate system is typically a plane or box positioned on a plane, and the graphical element may be rendered relative to an area of interest on the plane or box. Also, as discussed above, the area of interest on the plane may be defined by a quad. In cases where the graphical element coordinate system is defined by a quad, the graphical element may be rendered in the new frame based upon an updated quad defining the updated graphical element coordinate system in the screen space of the new frame, based on the homography transform and 6DOF camera pose transforms described above. In this way, the rendered graphical element may be rendered across multiple video frames in a way that appears the graphical element is fixed to a surface of a real-world object or objects that move within the multiple video frames, based on optical techniques for deriving the relative movement of the real-world object or objects between the frames.

Figure 9:
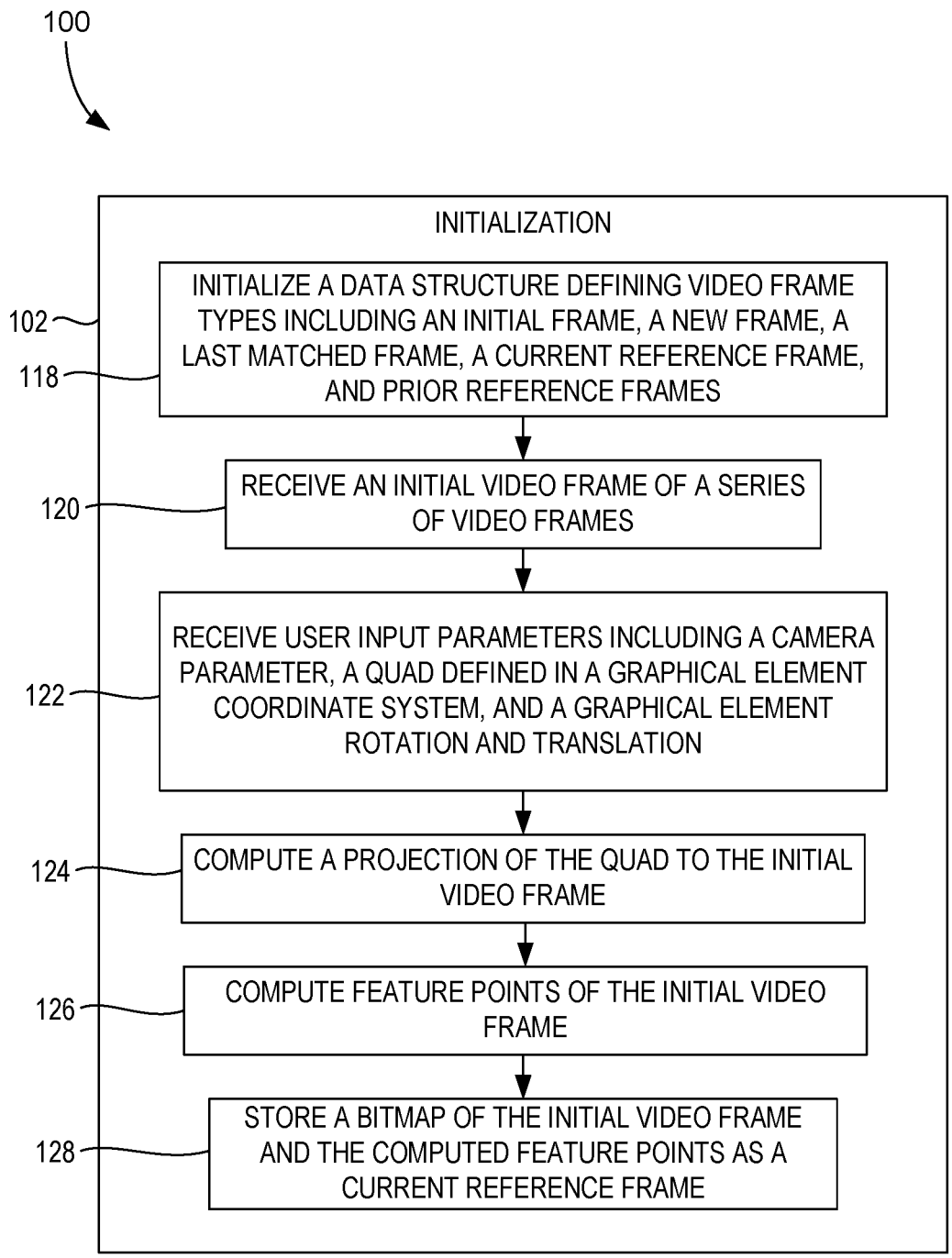
FIG. 9 is a continuation of the flowchart of FIG. 8, showing additional details of the initialization step of the method.

As shown in FIG. 9, in the initialization phase, the method 102 includes, as shown in FIG. 9 at 118, initializing a data structure defining video frame types including an initial frame, a new frame, a last matched frame, the current reference frame, and prior reference frames. These frame types are also depicted in FIG. 7, described above. At 120, the method includes receiving an initial video frame of the series of video frames, and at 122 the method includes receiving user input parameters including a camera parameter, a quad defined in a graphical element coordinate system, and a graphical element rotation and translation. More specifically, the user input typically includes a translation and rotation relative to a camera origin of the plane in three-dimensional world space on which the quad is placed, the three-dimensional coordinates of the quad on this plane, and a focal length of the camera. Alternatively, the user input may include screen space coordinates for the quad in the prior frame and the three-dimensional coordinates may be derived using image processing techniques. Further, additional camera parameters such as distortion may be received and taken into account. At 124, the method includes computing a projection of the quad to the initial video frame, based upon the user input. At 126, the method includes computing feature points of the initial video frame, which may be computed using SURF or SIFT feature descriptors, and/or an ORB feature detector, for example. At 128, the method includes storing a bitmap of the initial video frame and the computed feature points as a current reference frame. Following the initialization phase, the method flow returns to steps 104-112 to perform a matching phase. In the matching phase following the initialization phase, for each of a plurality of successive frames in the series of video frames, the method includes receiving the successive frame as a new frame, computing feature points for the new frame, selecting a candidate frame to match with the new frame as described above in step 104, and calculating a projection of a quad in the new frame.

FIG. 10 shows details of selecting the prior frame for matching at 104. As shown at 130, selecting the prior frame may be accomplished by selecting a candidate frame from among various identified frames that are stored in memory in the video frame pipeline, including the last matched frame, the current reference frame, and one or more of the prior reference frames. Further, the selection may be based on whether an area of interest including the projected quad is visible in the last matched frame, and further based on a size of a candidate transform computed to match the new frame to the current reference frame. Step 130 of selecting a candidate frame to match with the new frame may be accomplished by, as illustrated at 132, if the area of interest is not visible in the last matched frame then selecting each of the prior reference frames as candidate frames and calculating a homography transform between each of the prior reference frames and the new frame. Selecting a candidate frame at 130 may further include, at 134, if the area of interest is visible in the last matched frame then selecting the current reference frame as the candidate frame and calculating a homography transform between the current reference frame and the new frame. Finally, selecting a candidate frame at 130 may further include, at 136, if the area of interest is visible in the last matched frame and the calculated homography transform between the current reference frame and the new frame is larger than a predetermined threshold, then selecting the last matched frame as the candidate frame and calculating a homography transform between the last matched frame and the new frame. Selecting the candidate frame in this manner provides robustness for situations in which unmatched frames result due to camera shake, for example, and also in situations in which the area of interest does not appear in a candidate frame. Further, by checking whether the calculated homography transform is within a threshold, accuracy can be improved, since larger transforms may introduce errors that would decrease the accuracy of the tracking.

Figure 11:
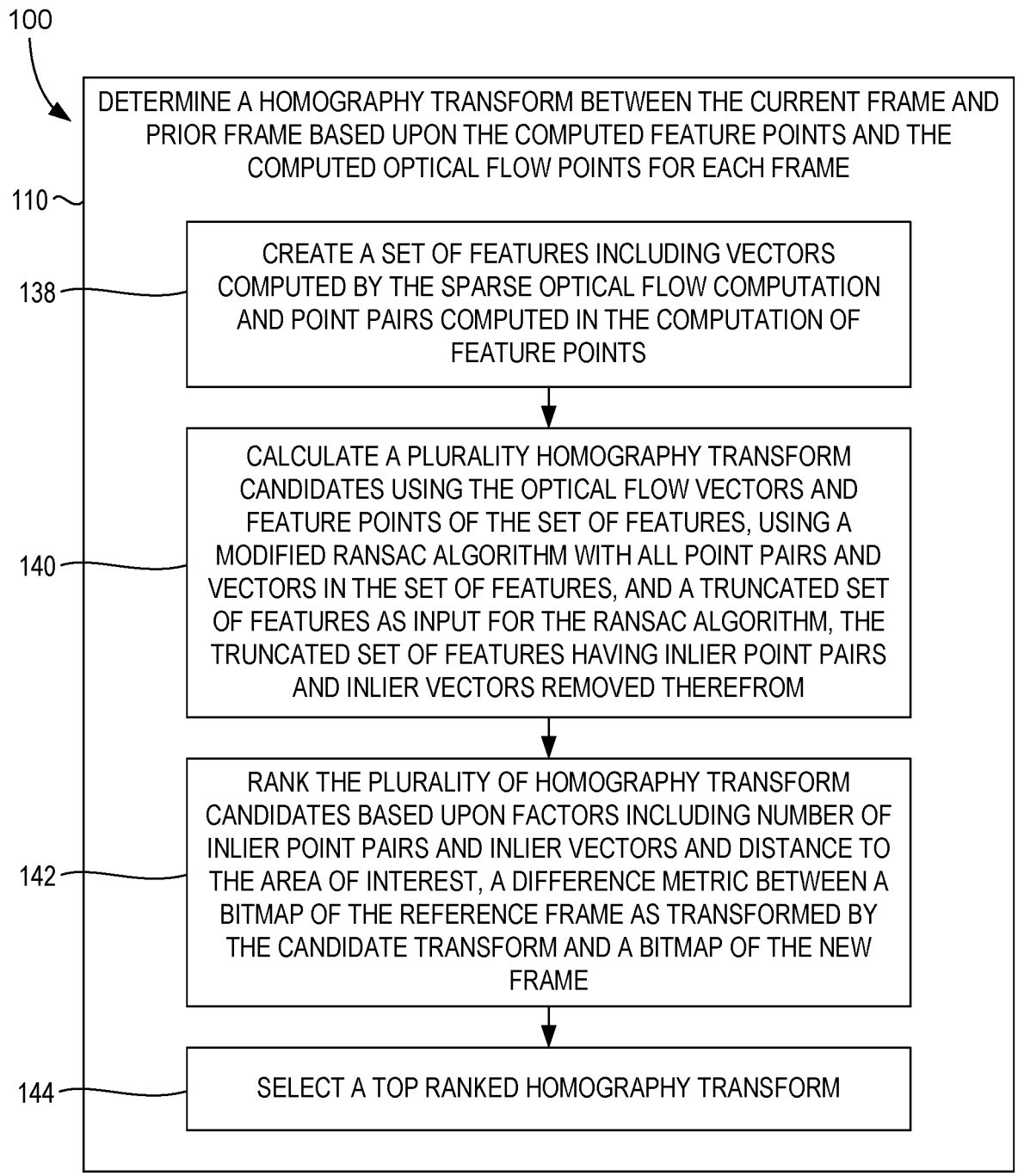
FIG. 11 is a continuation of the flowchart of FIG. 8, showing additional details of the determination step of the method.

FIG. 11 illustrates the details of the step 110 of determining a homography transform in FIG. 8. Determining the homography transform may be accomplished by, at 138, creating a set of features including vectors computed by the sparse optical flow computation and point pairs computed in the computation of feature points. At 140, the method may further include calculating a plurality homography transform candidates using the optical flow vectors and feature points of the set of features, using a modified Random Sample Consensus (RANSAC) algorithm with all point pairs and vectors in the set of features, and a truncated set of features as input for the RANSAC algorithm, the truncated set of features having inlier point pairs and inlier vectors removed therefrom. At 142, the method may include ranking the plurality of homography transform candidates based upon factors including number of inlier point pairs and inlier vectors and distance to the area of interest, a difference metric between a bitmap of the reference frame as transformed by the candidate transform and a bitmap of the new frame. At 144, the method may include selecting a top ranked homography transform from the computed rankings.

Figure 12:
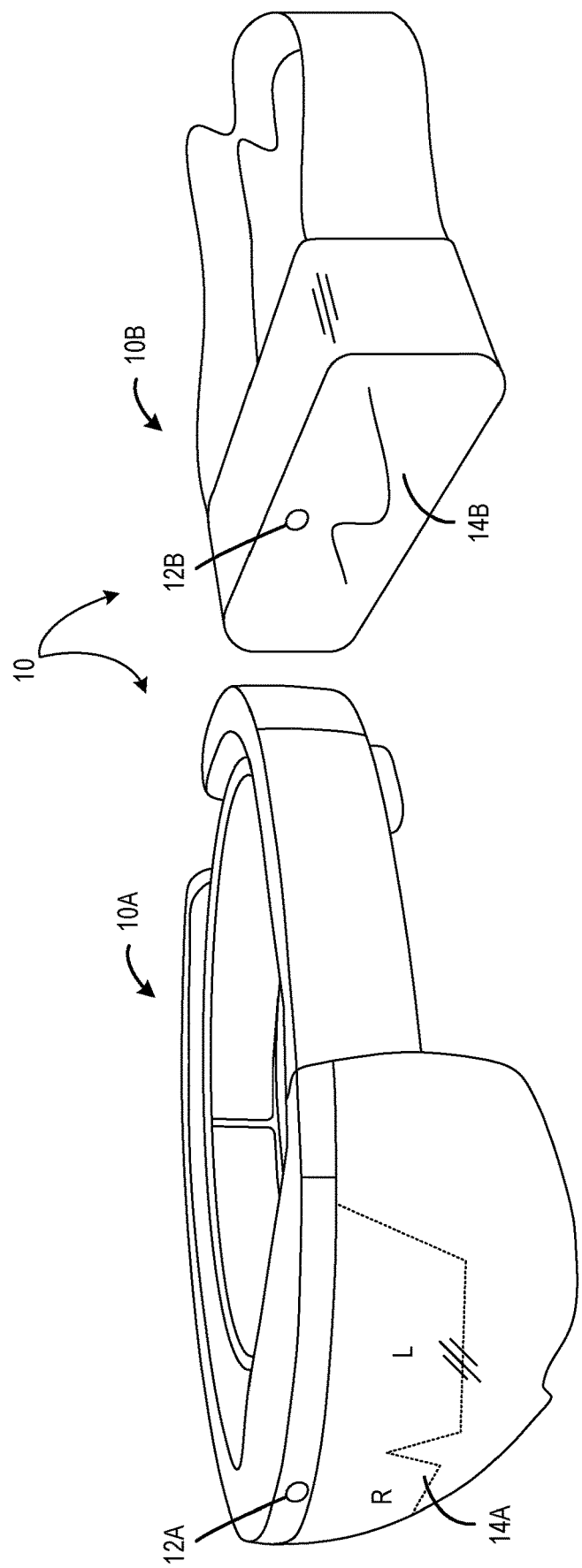
FIG. 12 is a view of an augmented reality head mounted display (HMD) device and a virtual reality HMD device that may be used as the computing device of FIG. 1.

FIG. 12 illustrates two additional examples of computing device 10, namely head mounted display (HMD) 10A and HMD 10B. HMD 10A includes a forward facing camera 12A and an at least partially see through display14A and is configured to display holograms on the display 14A in the user's view of the real world through the display 14A. HMD 10B includes a forward facing camera 12B and a fully opaque display 14B, and is configured to capture video of a real world environment and display it to the user via opaque display 14A, and also to display graphical content overlying the captured video on the display 14A. Both HMD 10A and 10B are battery powered devices that are worn on a user's head. HMD 10A and 10B may be equipped with IMUs and depth cameras configured to simultaneously perform localization of the HMD and mapping of the environment, a technique known as simultaneous localization and mapping (SLAM). It will be appreciated that the techniques described herein may be utilized even on devices such as HMD 10A and HMD 10B that are equipped with such SLAM capabilities. Various advantages may be gained by adopting the techniques described herein on such devices, including providing an option for a power saving technique over operation of depth sensing cameras and IMUs, which can consume significant power. Further, use of the techniques described herein may enable such HMDs to be outfitted with less power consuming, or less accurate, and thus less costly depth cameras and IMUs, thereby reducing the cost of the devices. Finally, the approaches may be executed in parallel with SLAM techniques, in a sensor fusion approach, to provide enhanced accuracy to SLAM techniques that rely on data from depth sensors and IMUSs, which can be valuable, for example, in conditions under which one or more sensors is temporarily unavailable.

Figure 13:
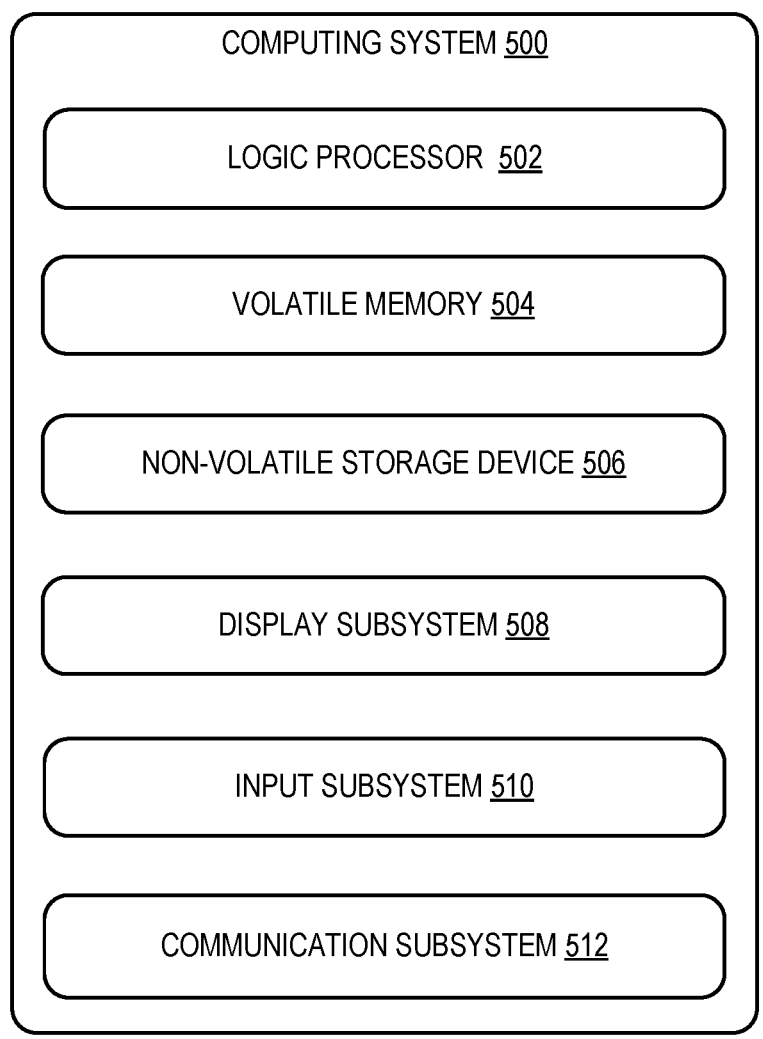
FIG. 13 is a schematic view of an example computing architecture and environment according to which the devices and methods of the present disclosure may be implemented.

FIG. 13 schematically shows a non-limiting embodiment of a computing system 500 that can enact one or more of the methods and processes described above. Computing system 500 is shown in simplified form. Computing system 500 may embody the computing device 10 described above. Computing system 500 may take the form of one or more personal computers, server computers, tablet computers, home-entertainment computers, network computing devices, gaming devices, mobile computing devices, mobile communication devices (e.g., smart phone), and/or other computing devices, and wearable computing devices such as smart wristwatches and head mounted augmented reality devices.

Computing system 500 includes a logic processor 502 volatile memory 504, and a non-volatile storage device 506. Computing system 500 may optionally include a display subsystem 508, input subsystem 510, communication subsystem 512, and/or other components not shown.

Logic processor 502 includes one or more physical devices configured to execute instructions. For example, the logic processor may be configured to execute instructions that are part of one or more applications, programs, routines, libraries, objects, components, data structures, or other logical constructs. Such instructions may be implemented to perform a task, implement a data type, transform the state of one or more components, achieve a technical effect, or otherwise arrive at a desired result.

The logic processor may include one or more physical processors (hardware) configured to execute software instructions. Additionally, or alternatively, the logic processor may include one or more hardware logic circuits or firmware devices configured to execute hardware-implemented logic or firmware instructions. Processors of the logic processor 502 may be single-core or multi-core, and the instructions executed thereon may be configured for sequential, parallel, and/or distributed processing. Individual components of the logic processor optionally may be distributed among two or more separate devices, which may be remotely located and/or configured for coordinated processing. Aspects of the logic processor may be virtualized and executed by remotely accessible, networked computing devices configured in a cloud-computing configuration. In such a case, these virtualized aspects are run on different physical logic processors of various different machines, it will be understood.

Non-volatile storage device 506 includes one or more physical devices configured to hold instructions executable by the logic processors to implement the methods and processes described herein. When such methods and processes are implemented, the state of non-volatile storage device 504 may be transformed—e.g., to hold different data.

Non-volatile storage device 506 may include physical devices that are removable and/or built-in. Non-volatile storage device 504 may include optical memory (e.g., CD, DVD, HD-DVD, Blu-Ray Disc, etc.), semiconductor memory (e.g., ROM, EPROM, EEPROM, FLASH memory, etc.), and/or magnetic memory (e.g., hard-disk drive, floppy-disk drive, tape drive, MRAM, etc.), or other mass storage device technology. Non-volatile storage device 506 may include nonvolatile, dynamic, static, read/write, read-only, sequential-access, location-addressable, file-addressable, and/or content-addressable devices. It will be appreciated that non-volatile storage device 506 is configured to hold instructions even when power is cut to the non-volatile storage device 506.

Volatile memory 504 may include physical devices that include random access memory. Volatile memory 504 is typically utilized by logic processor 502 to temporarily store information during processing of software instructions. It will be appreciated that volatile memory 504 typically does not continue to store instructions when power is cut to the volatile memory 504.

Aspects of logic processor 502, volatile memory 504, and non-volatile storage device 506 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 500 typically implemented in software by a processor to perform a particular function using portions of volatile memory, which function involves transformative processing that specially configures the processor to perform the function. Thus, a module, program, or engine may be instantiated via logic processor 502 executing instructions held by non-volatile storage device 506, using portions of volatile memory 504. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

When included, display subsystem 508 may be used to present a visual representation of data held by non-volatile storage device 506. The visual representation may take the form of a graphical user interface (GUI). As the herein described methods and processes change the data held by the non-volatile storage device, and thus transform the state of the non-volatile storage device, the state of display subsystem 508 may likewise be transformed to visually represent changes in the underlying data. Display subsystem 508 may include one or more display devices utilizing virtually any type of technology. Such display devices may be combined with logic processor 502, volatile memory 504, and/or non-volatile storage device 506 in a shared enclosure, or such display devices may be peripheral display devices.

When included, input subsystem 510 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity; and/or any other suitable sensor.

When included, communication subsystem 512 may be configured to communicatively couple various computing devices described herein with each other, and with other devices. Communication subsystem 512 may include wired and/or wireless communication devices compatible with one or more different communication protocols. As non-limiting examples, the communication subsystem may be configured for communication via a wireless telephone network, or a wired or wireless local- or wide-area network, such as a HDMI over Wi-Fi connection. In some embodiments, the communication subsystem may allow computing system 500 to send and/or receive messages to and/or from other devices via a network such as the Internet.

The following paragraphs provide additional support for the claims of the subject application. According to a first aspect, a computing device is provided that comprises a processor configured to compute feature points in a new frame and a prior frame of a series of successive video frames, compute optical flow vectors between the prior frame and new frame, determine a homography transform between the new frame and prior frame based upon the computed feature points and the computed optical flow vectors for each frame, apply the homography transform to the graphical element coordinate system in the prior frame to thereby generate an updated graphical element coordinate system in the new frame, generate a six degree of freedom camera pose transform between the graphical element coordinate system in the prior frame and the updated graphical element coordinate system in the new frame based on the homography transform and a camera pose of the graphical element coordinate system in the prior frame, and render an updated graphical element in the new frame relative to the updated graphical element coordinate system using the six degree of freedom camera pose transform. In this aspect, the homography transform may be determined between a detected plane in the new frame and a detected plane in the prior frame, and the updated graphical element is rendered relative to an area of interest on the detected plane. In this aspect, the area of interest on the plane may be defined by a quad, and a bounding box for the graphical element is constructed normal to the plane, with vertices at the quad, the graphical element being rendered relative to the bounding box. In this aspect, the graphical coordinate system may be defined by a quad having three-dimensional coordinates in world space and two-dimensional coordinates in screen space of the prior frame, generating the updated graphical element coordinate system in the new frame may include transforming the quad from the prior frame to an updated quad in the new frame using the homography transform, the updated quad having two-dimensional coordinates in the new frame, and generating the six degree of freedom camera pose transform may include computing the six degree of freedom camera pose transform based on an estimated camera projection between the two-dimensional screen space position of the updated quad in the new frame and the three-dimensional position of the quad in the prior frame, the estimated camera projection producing projected screen space coordinates in the new frame that differ from the two-dimensional coordinates of the quad in the new frame by an error value, the estimated camera projection being iteratively solved to minimize the error value.

In this aspect, the device may be selected from the group consisting of a desktop computer, laptop computer, server computer, camera, smartphone, or tablet, and the video frames may be received by the processor from one of an on-board camera, stored video, and external video feeds.

The prior frame may be selected from the group consisting of a last matched frame, a current reference frame, and prior reference frames.

In this aspect, selecting the prior frame for matching from among candidate frames may include selecting a candidate frame to match with the new frame, the candidate frame selected from the group consisting of the last matched frame, the current reference frame, and one or more of the prior reference frames, the selection being based on whether an area of interest including the graphical element coordinate system is visible in the last matched frame, and further based on a size of a candidate transform computed to match the new frame to the current reference frame. In this aspect, selecting a candidate frame to match with the new frame may include: if the area of interest is not visible in the last matched frame then selecting each of the prior reference frames as candidate frames and calculating a homography transform between each of the prior reference frames and the new frame. In this aspect, selecting a candidate frame to match with the new frame may further include if the area of interest is visible in the last matched frame then selecting the current reference frame as the candidate frame and calculating a homography transform between the current reference frame and the new frame. In this aspect, selecting a candidate frame to match with the new frame may further includes if the area of interest is visible in the last matched frame and the calculated homography transform between the current reference frame and the new frame is larger than a predetermined threshold, then selecting the last matched frame as the candidate frame and calculating a homography transform between the last matched frame and the new frame.

In this aspect, the processor may be configured to determine the homography transform by creating a set of features including vectors computed by the sparse optical flow computation and point pairs computed in the computation of feature points, calculating a plurality homography transform candidates using the optical flow vectors and feature points of the set of features, using a modified RANSAC algorithm with all point pairs and vectors in the set of features, and a truncated set of features as input for the RANSAC algorithm, the truncated set of features having inlier point pairs and inlier vectors removed therefrom, ranking the plurality of homography transform candidates based upon factors including number of inlier point pairs and inlier vectors and distance to the area of interest, a difference metric between a bitmap of the reference frame as transformed by the candidate transform and a bitmap of the new frame, and selecting a top ranked homography transform.

According to another aspect, a computing method is provided that comprises computing feature points in a new frame and a prior frame of a series of successive video frames, computing optical flow vectors between the prior frame and new frame, determining a homography transform between the new frame and prior frame based upon the computed feature points and the computed optical flow vectors for each frame, applying the homography transform to the graphical element coordinate system in the prior frame to thereby generate an updated graphical element coordinate system in the new frame, generating a six degree of freedom camera pose transform between the graphical element coordinate system in the prior frame and the updated graphical element coordinate system in the new frame based on the homography transform and a camera pose of the graphical element coordinate system in the prior frame, and rendering an updated graphical element in the new frame relative to the updated graphical element coordinate system using the six degree of freedom camera pose transform.

In this aspect, the homography transform may be determined between a detected plane in the new frame and a detected plane in the prior frame, and the updated graphical element may be rendered relative to an area of interest on the detected plane. In this aspect, the prior frame may be selected from the group consisting of a last matched frame, a current reference frame, and prior reference frames, the selection being based on whether an area of interest including the graphical element coordinate system is visible in the last matched frame, and further based on a size of a candidate transform computed to match the new frame to the current reference frame.

In this aspect, determining the homography transform may includes creating a set of features including vectors computed by the sparse optical flow computation and point pairs computed in the computation of feature points, calculating a plurality homography transform candidates using the optical flow vectors and feature points of the set of features, using a modified RANSAC algorithm with all point pairs and vectors in the set of features, and a truncated set of features as input for the RANSAC algorithm, the truncated set of features having inlier point pairs and inlier vectors removed therefrom, ranking the plurality of homography transform candidates based upon factors including number of inlier point pairs and inlier vectors and distance to the area of interest, a difference metric between a bitmap of the reference frame as transformed by the candidate transform and a bitmap of the new frame, selecting a top ranked homography transform.

According to another aspect, a computing device is provided, comprising a processor configured to analyze a series of successive video frames, and further configured to, in an initialization phase, initialize a data structure defining video frame types including an initial frame, a new frame, a last matched frame, the current reference frame, and prior reference frames, receive an initial video frame of the series of video frames, receive user input parameters including a camera parameter, a quad defined in a graphical element coordinate system, and a graphical element coordinate system rotation and translation, compute a projection of the quad to the initial video frame, compute feature points of the initial video frame, and store a bitmap of the initial video frame and the computed feature points as a current reference frame. The processor may further be configure to, in a matching phase, for each of a plurality of successive frames in the series, receive the successive frame as a new frame, compute feature points for the new frame, select a candidate frame to match with the new frame, the candidate frame selected from the group consisting of the last matched frame, the current reference frame, and one or more of the prior reference frames, the selection being based on whether an area of interest including the projected quad is visible in the last matched frame, and further based on a size of a candidate transform computed to match the new frame to the reference frame, the candidate frame including a projected quad, compute a sparse optical flow between an area of interest including the projected quad in the candidate frame and a corresponding area of interest in the new frame, create a set of features including vectors computed by the sparse optical flow computation and point pairs computed in the computation of feature points, calculating a plurality homography transform candidates using the optical flow vectors and feature points of the set of features, using a modified RANSAC algorithm with all point pairs and vectors in the set of features, and a truncated set of features as input for the RANSAC algorithm, the truncated set of features having inlier point pairs and inlier vectors removed therefrom, rank the plurality of homography transform candidates based upon factors including number of inlier point pairs and inlier vectors and distance to the area of interest, a difference metric between a bitmap of the reference frame as transformed by the candidate transform and a bitmap of the new frame, select a top ranked homography transform, apply the top ranked homography transform to the projected quad in the candidate frame to thereby generate an updated quad in the new frame; and generate a six degree of freedom camera pose transform based on the homography transform, a camera pose of the quad in the prior frame, and the user input parameters.

In this aspect, the sparse optical flow may be computed by computing the sparse optical flow between the new frame and the last matched frame. In this aspect, the applying of the homography transform may be accomplished by using the top ranked homography transform to move the projection of the quad in the candidate frame to the new frame according to an estimated camera motion. In this aspect, the generating of the six degree of freedom camera pose transform may further include minimizing screen coordinate distances between the projected three-dimensional quad from the candidate frame projected into screen space for the new frame and the two-dimensional quad from the candidate frame transformed by the homography transform into two-dimensional coordinates in the new frame. In this aspect, the processor may be further configured to render an updated graphical element in the new frame relative to the updated quad using the six degree of freedom camera pose transform.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computing device, comprising:
a processor configured to:
compute feature points in a new frame and a prior frame of a series of successive video frames;
compute an optical flow between an area of interest on a detected plane in the prior frame and a corresponding area of interest on a detected plane in the new frame;
create a set of features including optical flow vectors computed by the optical flow computation and point pairs computed in the computation of feature points;
determine a homography transform by:
calculating a plurality of homography transform candidates between the new frame and prior frame based upon the optical flow vectors and feature points of the set of features for each frame;
ranking the plurality of homography transform candidates based upon factors including number of inlier point pairs and inlier vectors and distance to the area of interest, a difference metric between a bitmap of the prior frame as transformed by the candidate transform and a bitmap of the new frame; and selecting a top ranked homography transform from the plurality of homography transform candidates;

apply the homography transform to the graphical element coordinate system in the prior frame to thereby generate an updated graphical element coordinate system in the new frame;

generate a six degree of freedom camera pose transform between the graphical element coordinate system in the prior frame and the updated graphical element coordinate system in the new frame based on the homography transform and a camera pose of the graphical element coordinate system in the prior frame; and render an updated graphical element in the new frame relative to the updated graphical element coordinate system using the six degree of freedom camera pose transform.

2. The computing device of claim 1, wherein the homography transform is determined between the detected plane in the new frame and the detected plane in the prior frame, and the updated graphical element is rendered relative to the area of interest on the detected plane.

3. The computing device of claim 2, wherein
the area of interest on the plane is defined by a quad; and
a bounding box for the graphical element is constructed normal to the plane, with vertices at the quad, the graphical element being rendered relative to the bounding box.

4. The computing device of claim 1, wherein
the graphical coordinate system is defined by a quad having three-dimensional coordinates in world space and two-dimensional coordinates in screen space of the prior frame;
generating the updated graphical element coordinate system in the new frame includes transforming the quad from the prior frame to an updated quad in the new frame using the homography transform, the updated quad having two-dimensional coordinates in the new frame; and
generating the six degree of freedom camera pose transform includes computing the six degree of freedom camera pose transform based on an estimated camera projection between the two-dimensional screen space position of the updated quad in the new frame and the three-dimensional position of the quad in the prior frame, the estimated camera projection producing projected screen space coordinates in the new frame that differ from the two-dimensional coordinates of the quad in the new frame by an error value, the estimated camera projection being iteratively solved to minimize the error value.

5. The computing device of claim 1, wherein
the device is a selected from the group consisting of a desktop computer, laptop computer, server computer, camera, smartphone, or tablet; and
the video frames are received by the processor from one of an on-board camera, stored video, and external video feeds.

6. The computing device of claim 1, wherein the prior frame is selected from the group consisting of a last matched frame, a current reference frame, and prior reference frames.

7. The computing device of claim 6, wherein selecting the prior frame for matching from among candidate frames includes selecting a candidate frame to match with the new frame, the candidate frame selected from the group consisting of the last matched frame, the current reference frame, and one or more of the prior reference frames, the selection being based on whether an area of interest including the graphical element coordinate system is visible in the last matched frame, and further based on a size of a candidate transform computed to match the new frame to the current reference frame.

8. The computing device of claim 7, wherein selecting a candidate frame to match with the new frame includes:
if the area of interest is not visible in the last matched frame then selecting each of the prior reference frames as candidate frames and calculating a homography transform between each of the prior reference frames and the new frame.

9. The computing device of claim 8, wherein selecting a candidate frame to match with the new frame further includes:
if the area of interest is visible in the last matched frame then selecting the current reference frame as the candidate frame and calculating a homography transform between the current reference frame and the new frame.

10. The computing device of claim 9, wherein selecting a candidate frame to match with the new frame further includes:
if the area of interest is visible in the last matched frame and the calculated homography transform between the current reference frame and the new frame is larger than a predetermined threshold, then selecting the last matched frame as the candidate frame and calculating a homography transform between the last matched frame and the new frame.

11. The computing device of claim 1, wherein the processor is configured to
calculate the plurality of homography transform candidates using the optical flow vectors and feature points of the set of features, using a modified RANSAC algorithm with all point pairs and vectors in the set of features, and a truncated set of features as input for the RANSAC algorithm, the truncated set of features having inlier point pairs and inlier vectors removed therefrom.

12. A computing method, comprising:
computing feature points in a new frame and a prior frame of a series of successive video frames;
computing an optical flow between an area of interest on a detected plane in the prior frame and a corresponding area of interest on a detected plane in the new frame;
creating a set of features including optical flow vectors computed by the optical flow computation and point pairs computed in the computation of feature points;
determining a homography transform by:
calculating a plurality of homography transform candidates between the new frame and prior frame based upon the optical flow vectors and feature points of the set of features for each frame;
ranking the plurality of homography transform candidates based upon factors including number of inlier point pairs and inlier vectors and distance to the area of interest, a difference metric between a bitmap of the prior frame as transformed by the candidate transform and a bitmap of the new frame; and
selecting a top ranked homography transform from the plurality of homography transform candidates;

applying the homography transform to the graphical element coordinate system in the prior frame to thereby generate an updated graphical element coordinate system in the new frame;

generating a six degree of freedom camera pose transform between the graphical element coordinate system in the prior frame and the updated graphical element coordinate system in the new frame based on the homography transform and a camera pose of the graphical element coordinate system in the prior frame; and rendering an updated graphical element in the new frame relative to the updated graphical element coordinate system using the six degree of freedom camera pose transform.

13. The computing method of claim 12, wherein the homography transform is determined between the detected plane in the new frame and the detected plane in the prior frame, and the updated graphical element is rendered relative to the area of interest on the detected plane.

14. The computing method of claim 12, wherein the prior frame is selected from the group consisting of a last matched frame, a current reference frame, and prior reference frames, the selection being based on whether an area of interest including the graphical element coordinate system is visible in the last matched frame, and further based on a size of a candidate transform computed to match the new frame to the current reference frame.

15. The computing method of claim 12,
further comprising calculating the plurality homography transform candidates using the optical flow vectors and feature points of the set of features, using a modified RANSAC algorithm with all point pairs and vectors in the set of features, and a truncated set of features as input for the RANSAC algorithm, the truncated set of features having inlier point pairs and inlier vectors removed therefrom.

16. A computing device, comprising:
a processor configured to analyze a series of successive video frames, and further configured to:
in an initialization phase:
initialize a data structure defining video frame types including an initial frame, a new frame, a last matched frame, the current reference frame, and prior reference frames;
receive an initial video frame of the series of video frames;
receive user input parameters including a camera parameter, a quad defined in a graphical element coordinate system, and a graphical element coordinate system rotation and translation;
compute a projection of the quad to the initial video frame;
compute feature points of the initial video frame;
store a bitmap of the initial video frame and the computed feature points as a current reference frame;
in a matching phase, for each of a plurality of successive frames in the series:
receive the successive frame as a new frame;
compute feature points for the new frame;
select a candidate frame to match with the new frame, the candidate frame selected from the group consisting of the last matched frame, the current reference frame, and one or more of the prior reference frames, the selection being based on whether an area of interest including the projected quad is visible in the last matched frame, and further based on a size of a candidate transform computed to match the new frame to the reference frame, the candidate frame including a projected quad;

compute a sparse optical flow between an area of interest including the projected quad in the candidate frame and a corresponding area of interest in the new frame;

create a set of features including vectors computed by the sparse optical flow computation and point pairs computed in the computation of feature points;

calculate a plurality homography transform candidates using the optical flow vectors and feature points of the set of features, using a modified RANSAC algorithm with all point pairs and vectors in the set of features, and a truncated set of features as input for the RANSAC algorithm, the truncated set of features having inlier point pairs and inlier vectors removed therefrom;

rank the plurality of homography transform candidates based upon factors including number of inlier point pairs and inlier vectors and distance to the area of interest, a difference metric between a bitmap of the reference frame as transformed by the candidate transform and a bitmap of the new frame;

select a top ranked homography transform;

apply the top ranked homography transform to the projected quad in the candidate frame to thereby generate an updated quad in the new frame; and generate a six degree of freedom camera pose transform based on the homography transform, a camera pose of the quad in the prior frame, and the user input parameters.

17. The computing device of claim 16, wherein the sparse optical flow is computed by computing the sparse optical flow between the new frame and the last matched frame.

18. The computing device of claim 16, wherein the applying of the homography transform is accomplished by using the top ranked homography transform to move the projection of the quad in the candidate frame to the new frame according to an estimated camera motion.

19. The computing device of claim 18, wherein the generating of the six degree of freedom camera pose transform further includes minimizing screen coordinate distances between the projected three-dimensional quad from the candidate frame projected into screen space for the new frame and the two-dimensional quad from the candidate frame transformed by the homography transform into two-dimensional coordinates in the new frame.

20. The computing device of claim 16, wherein the processor is further configured to render an updated graphical element in the new frame relative to the updated quad using the six degree of freedom camera pose transform.

* * * * *